United States Patent [19]
Lux et al.

[11] Patent Number: 5,484,353
[45] Date of Patent: Jan. 16, 1996

[54] METHOD FOR REDUCING DRIVELINE DISTURBANCES BY CONTROLLING TORQUE CONVERTER CLUTCH APPLICATION

[75] Inventors: Jeffrey P. Lux, Yokohama, Japan; John W. Boughner, Middle Park, Australia; Joseph R. Dulzo, Redford, Mich.

[73] Assignee: General Motors Corporation, Detroit, Mich.

[21] Appl. No.: 195,133

[22] Filed: Feb. 14, 1994

[51] Int. Cl.⁶ .......................... F16H 61/14; B60K 41/02
[52] U.S. Cl. .......................... 477/169; 477/175
[58] Field of Search .......................... 477/168, 169, 477/175

[56] References Cited

U.S. PATENT DOCUMENTS

| | | | |
|---|---|---|---|
| 4,056,177 | 11/1977 | Ahlen et al. | 477/169 |
| 4,596,322 | 6/1986 | Nishimura et al. | 477/169 X |
| 4,640,396 | 2/1987 | Nishimura | 477/169 X |
| 5,277,287 | 1/1994 | Ishii et al. | 477/169 X |
| 5,323,320 | 6/1994 | Hathaway et al. | 477/169 X |

FOREIGN PATENT DOCUMENTS

| | | | |
|---|---|---|---|
| 357077232 | 5/1982 | Japan | 477/175 |
| 359062764 | 4/1984 | Japan | 477/165 |
| 360151457 | 8/1985 | Japan | 477/175 |
| 40130967 | 2/1989 | Japan | 477/169 |

*Primary Examiner*—Rodney H. Bonck
*Assistant Examiner*—Nathan O. Jensen
*Attorney, Agent, or Firm*—Vincent A. Cichosz

[57] ABSTRACT

A torque converter clutch control reduces or eliminates undesirable driveline disturbances through throttle position or load based criteria. A region of vehicle operation delineated by vehicle speed prone to driveline disturbances during certain vehicle operating conditions is used to predict such disturbances and disengage the torque converter clutch. Disturbances are cumulated and upon reaching a predetermined number of events the control substitutes certain torque converter clutch apply/release patterns to further reduce such disturbances.

8 Claims, 6 Drawing Sheets

5,484,353

METHOD FOR REDUCING DRIVELINE DISTURBANCES BY CONTROLLING TORQUE CONVERTER CLUTCH APPLICATION

BACKGROUND OF THE INVENTION

This invention relates to a control of a torque converter clutch and more particularly to a system for regulating the application of the clutch to control undesirable driveline torque disturbances.

Introduced as an efficiency increasing device, the torque converter clutch is a fluid operated friction device engageable to couple the impeller (input) and turbine (output) of a hydraulic torque converter. In the usual application, the clutch is either fully released to permit hydrodynamic coupling between the engine and transmission gearset or fully engaged to permit direct mechanical coupling therebetween. An unfortunate aspect of full converter clutch engagement is that the engine torque perturbations or torsionals normally absorbed by the torque converter are passed directly through the clutch to the remainder of the vehicle drivetrain and vehicle structure and may produce annoying pulsations and undesirable fore-aft surging, commonly referred to as chuggle, if not properly damped. This factor operates to restrict the usage of the torque converter clutch to specified vehicle operating conditions for which most annoying effects are minimized. However, certain vehicle operating conditions prone to these disturbances may not be recognizable by conventional torque converter clutch control.

SUMMARY OF THE INVENTION

Therefore, it is an object of the present invention to provide torque converter clutch control which recognizes torque induced driveline disturbances and takes appropriate control measures to terminate current, and prevent future, occurrences.

A motor vehicle has an internal combustion engine coupled at the output thereof to a gearset of a transmission at the input thereof. Coupling is accomplished hydrodynamically by way of a torque converter when the torque converter clutch is released and mechanically when the torque converter clutch is applied.

According to one aspect of the present invention, engine output torque variations ordinarily coupled to the vehicle structure through a torque converter clutch applied in accordance with a base apply/release pattern are decoupled therefrom by controlling the release of the torque converter clutch when driveline disturbances are predicted from engine speed and engine load quantities.

According to another aspect of the invention, predicted driveline disturbances occur when the vehicle engine operation is within predetermined parameters of engine speed and engine load for a predetermined interval.

According to another aspect of the invention, a predetermined number of predicted driveline disturbances will invoke utilization of an adaptive apply/release pattern in place of the base apply/release pattern for the purpose of preventing torque induced driveline disturbances for a predetermined interval.

DETAILED DESCRIPTION OF THE DRAWINGS

Figure 1:
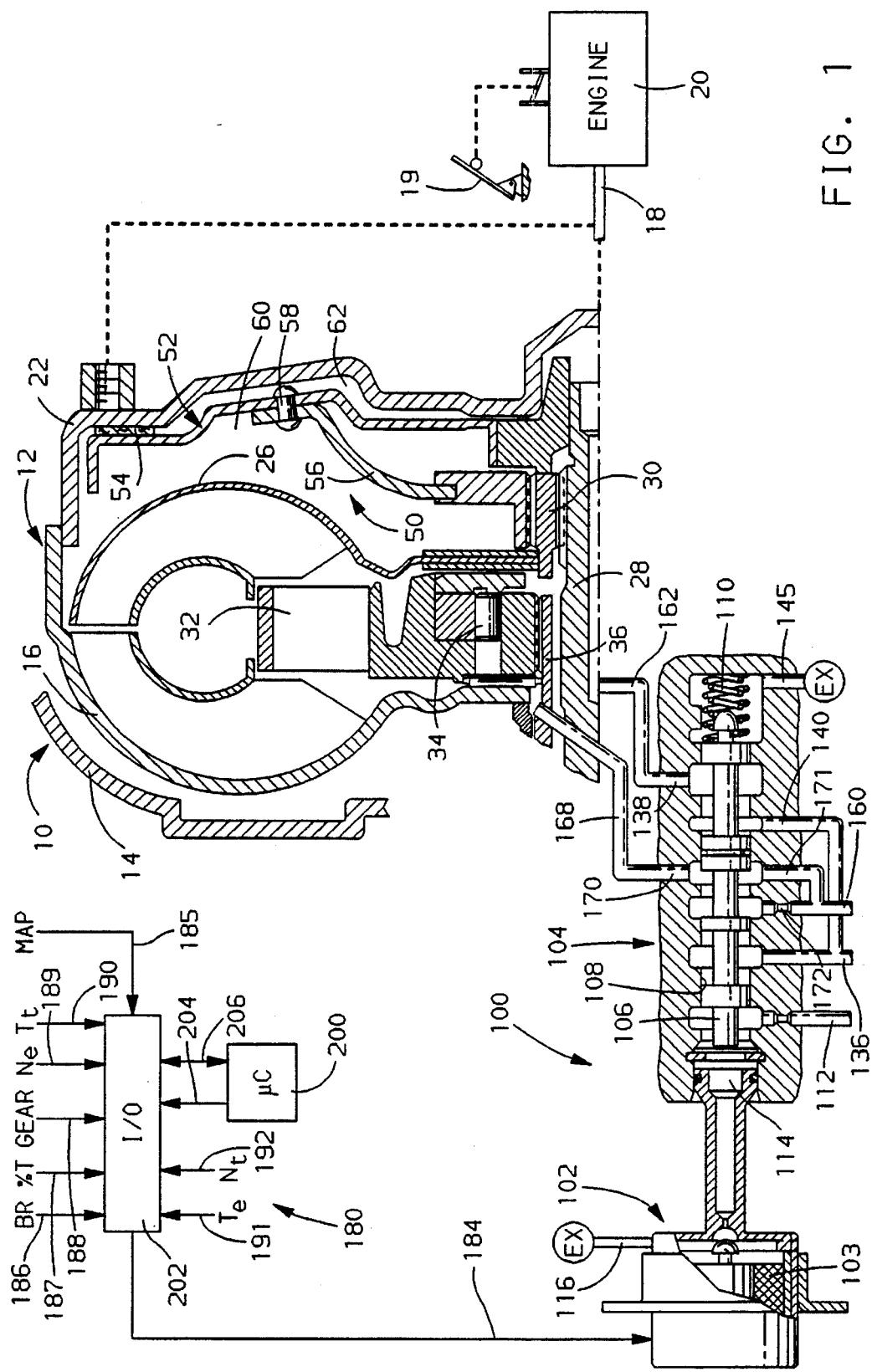
FIG. 1 illustrates a control system in accordance with the present invention.

Referring to the drawings, and more particularly to FIG. 1, the reference numeral 10 generally designates a portion of an automatic transmission including a conventional fluidic torque converter 12 disposed within the transmission housing 14. The impeller or input member 16 of torque converter 12 is connected to be rotatably driven by the output shaft 18 of engine 20 through the input shell 22. The turbine or output member 26 of the torque converter 12 is rotatably driven by the impeller 16 by means of fluid transfer therebetween, and is connected to rotatably drive the torque converter output shaft 28 through a splined hub member 30. The converter output shaft 28 is coupled via a splined connection (not shown) to a gearset defining a plurality of speed ratios between the converter output shaft 28 and the transmission output shaft. A stator 32 redirects the fluid coupling impeller 16 to the turbine 26 and is connected through a one-way device 34 and a splined sleeve shaft 36 to the transmission housing 14.

Also disposed within the transmission housing 14 is a torque converter clutch assembly, generally designated by the reference numeral 50. Clutch 50 includes a clutch plate 52 having a friction surface 54 and a drive member 56 coupled for rotation to clutch plate 52 by rivet connector 58. The drive member 56 and plate 52 are axially slidable on hub member 30, and the drive member 56 is splined onto hub member 30 so that the engagement of friction surface 54 of clutch plate 52 with the input shell 22 provides a mechanical drive between the input shell 22 and the converter output shaft 28.

Clutch plate 52 divides the space between turbine 26 and input shell 22 into two fluid chambers: an apply chamber 60 and a release chamber 62. When the fluid pressure in the apply chamber 60 exceeds that in the release chamber 62, there is a resultant force which tends to move the friction surface 54 into engagement with input shell 22. Such force tends to reduce the slippage between the impeller 16 and turbine 26, and when sufficiently great, fully engages the clutch 50 to prevent such slippage entirely thereby providing direct mechanical coupling between the engine and transmission gearset. When the fluid pressure in release chamber 62 exceeds that in apply chamber 60, there is a resultant force which tends to move the friction surface 54 out of engagement with input shell 22. Such force tends to increase the slippage between impeller 16 and turbine 26, and when sufficiently great, fully releases the clutch 50 to permit unrestrained slippage therebetween and hydrodynamic coupling between the engine and transmission gearset. The control system of this invention operates as described below to control the fluid pressure in the apply and release chambers 60 and 62 to control the torque capacity of clutch 50.

TCC valve 100 comprises an integral solenoid valve 102 and spool valve 104, the spool 106 being linearly displaceable within valve bore 108 through energization of coil 103 of solenoid valve 102 and resultant pressure in chamber 114. When the solenoid coil is de-energized, TCC line 112 and chamber 114 are exhausted via exhaust port 116 thereby allowing spring 110 to displace spool into the release position (left in FIG. 1). When the solenoid coil is energized, exhaust port 116 is blocked and fluid from TCC line 112 pressurizes chamber 114 thereby displacing spool 106 against spring 110 to the apply position (right in FIG. 1).

When solenoid valve 102 is de-energized and chamber 114 is exhausted, spool 106 is in the release position as illustrated in FIG. 1. This position allows converter feed line 136 to supply pressure to release line 162 via inlet port 140 and outlet port 138 of TCC valve 100. Converter feed fluid is routed into release chamber 62 thereby releasing and maintaining release of converter clutch plate 52 from input shell 22 and filling the converter with fluid. Fluid exits the converter through apply line 168, ports 170, 171 and 172 of TCC valve 100 to cooler & lube line 160. Converter fluid is continually circulated via this fluid circuit in the release mode.

When solenoid valve 102 is energized and chamber 114 is pressurized, spool 106 displaces to the right to the apply position. This position allows converter feed line 136 to supply fluid to apply line 168 via inlet port 140 and outlet port 170 of TCC valve 100. At the same time, the release fluid circuit is opened to exhaust port 145 of TCC valve 100. Converter feed fluid is routed into apply chamber 60 thereby applying and maintaining apply of converter clutch plate 52 to input shell 22 and filling the converter with fluid.

The energization of solenoid valve 102 is controlled by an electronic control unit 180 via control line 184. The control is made in response to a number of input signals including a manifold absolute pressure signal (MAP) on line 185, a brake signal (BR) on line 186, an engine throttle signal (% T) on line 187, a transmission gear signal (GEAR) on line 188, an engine speed signal ($N_e$) on line 189, a transmission oil temperature signal ($T_t$) on line 190, a coolant temperature signal ($T_e$) on line 191 and a turbine speed signal ($N_t$) on line 192. The brake signal may be obtained with a switch mechanism (not shown) responsive to movement of the vehicle brake pedal such that depression of the brake pedal causes a change in the output state of the brake signal. The engine throttle signal may be obtained with a suitable transducer, such as a rotary potentiometer responsive to the position of the accelerator pedal 19 or engine throttle for producing an electrical output signal in accordance therewith. The transmission gear signal may be obtained with suitable pressure transducers (not shown) located with respect to the fluid conducting passages of the transmission 10 in a manner to determine which gear ratio is engaged. The turbine speed and engine speed signals are obtained from conventional speed transducers. The speed transducers may be of the variable reluctance type which cooperate with magnetic gear teeth formed on the surface of a rotating shaft in a manner well known in the art.

As indicated in FIG. 1, the electronic control unit 180 essentially comprises a microcomputer (μC) 200, an input/output (I/O) device 202, which communicates with microcomputer 200 via an address and control bus 204 and a bi-directional data bus 206, and a high frequency clock (not shown) for supplying microcomputer 200 with a high frequency pulse train for controlling the operational timing of the same. Microcomputer 200 includes Random-Access-Memory (RAM), Read-Only-Memory (ROM) and timing circuitry, and microprocessor such as the M68HC11 microprocessor commercially available from Motorola. The MAP, brake, throttle, gear, engine speed, transmission oil temperature, coolant temperature and turbine speed signals on lines 185, 186, 187, 188, 189, 190, 191 and 192 are applied as inputs to I/O device 202, and I/O device 202 further includes circuitry for converting analog input signals to a digital format and for developing suitable control signals on line 184 for controlling the energization of solenoid valve 102 in response to duty cycle commands developed by microcomputer 200. Other signals are input to I/O device 202 in accordance with other engine and transmission control functions.

Figure 3:
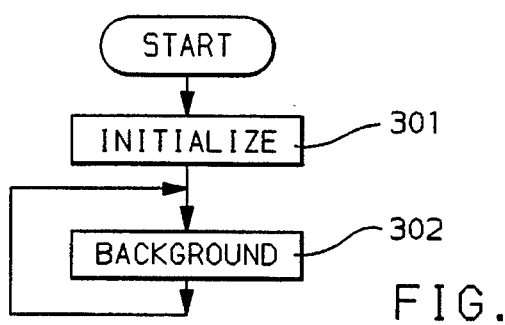
FIGS. 3–6 illustrate various flow charts representative of computer executed commands for carrying out the control of the invention.
Figure 4:
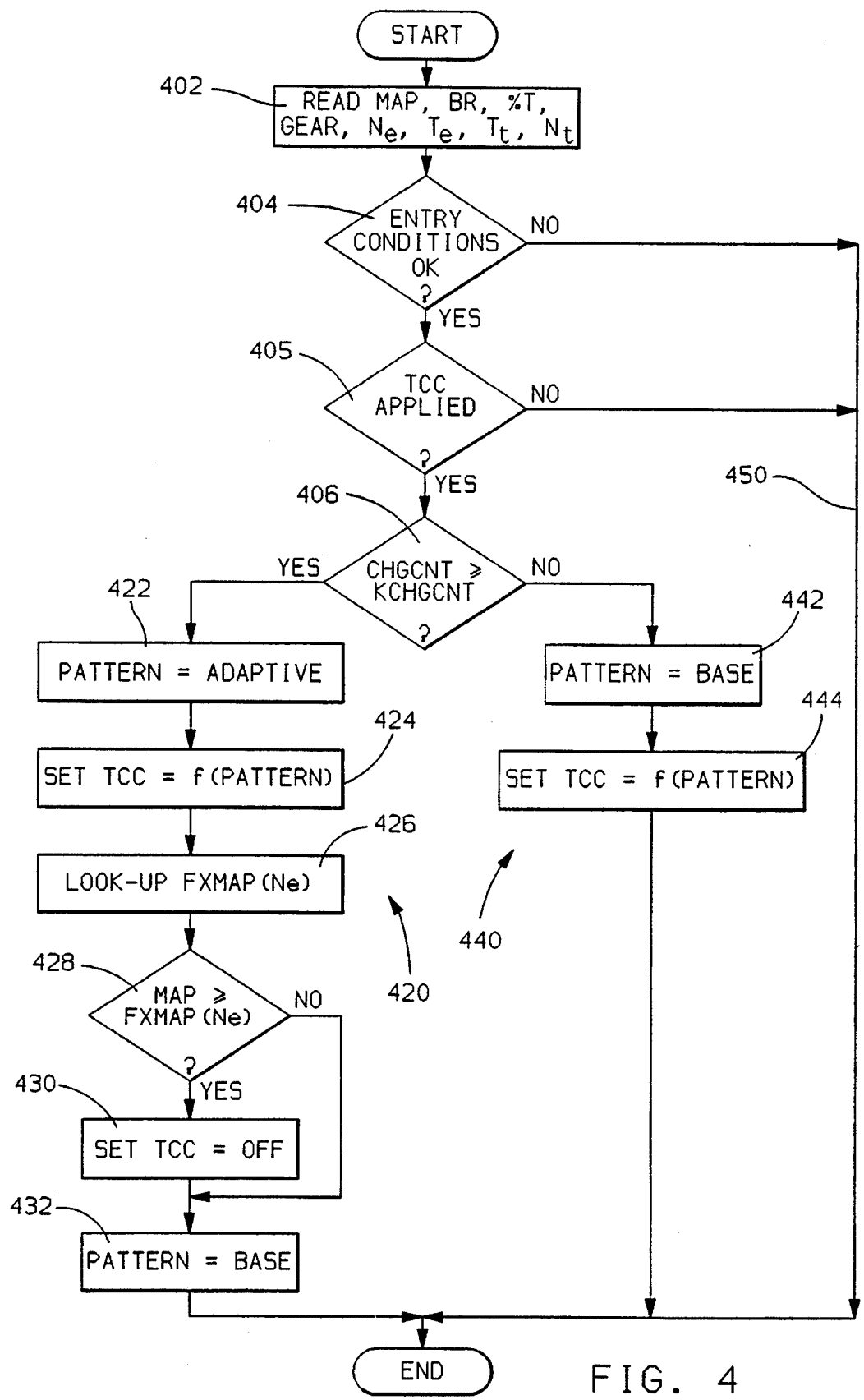
Figure 5:
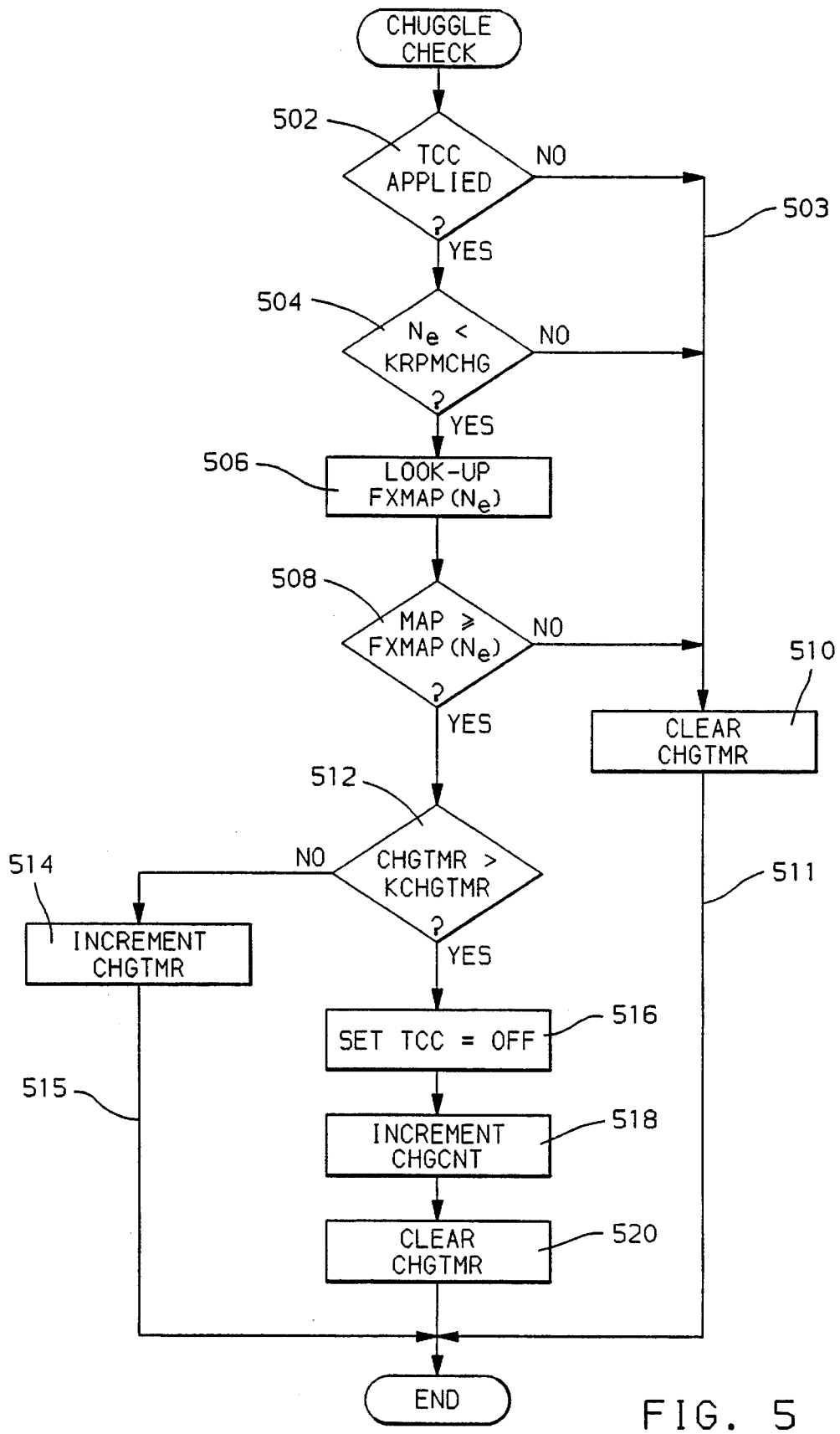
Figure 6:
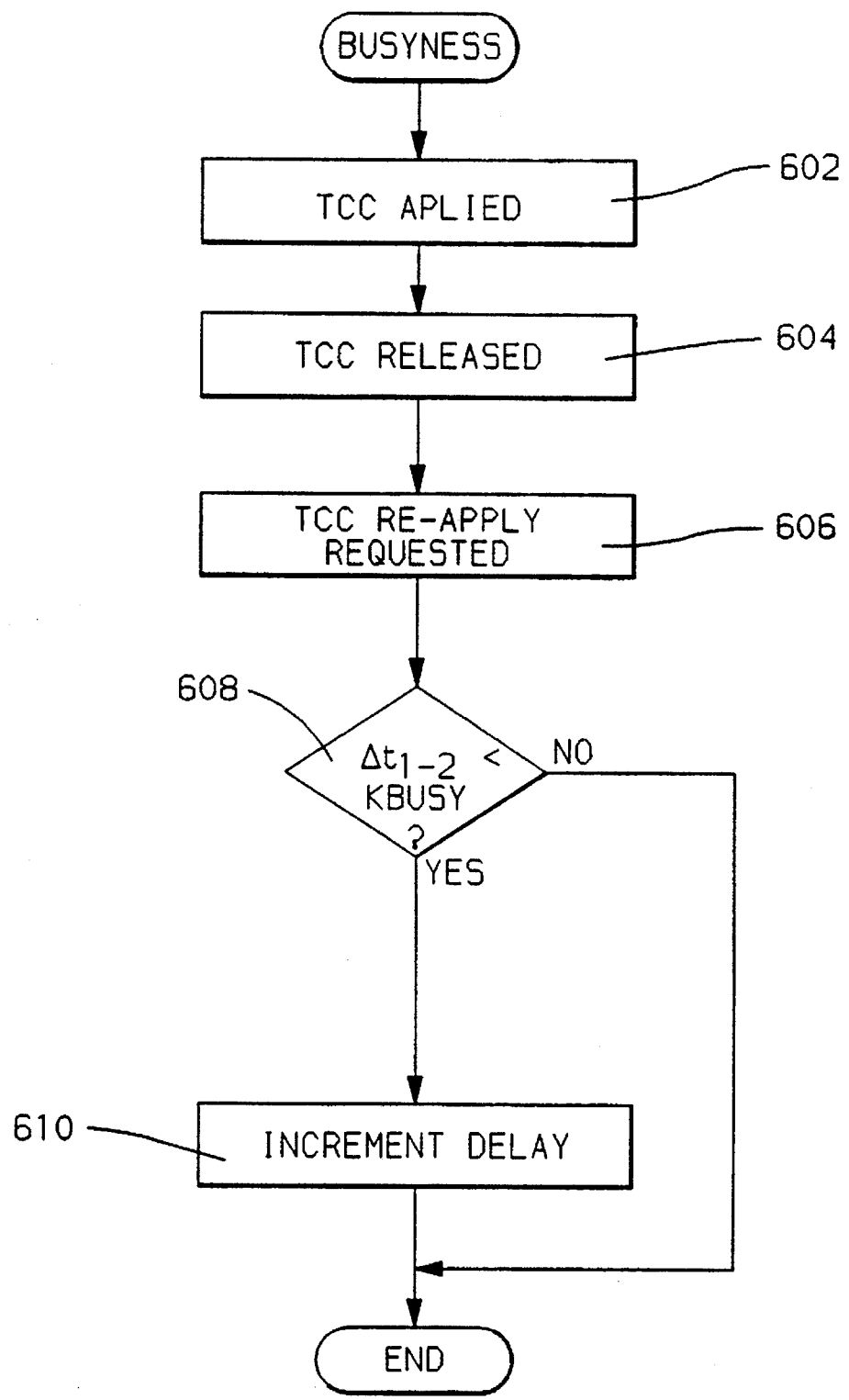
Figure 7A:
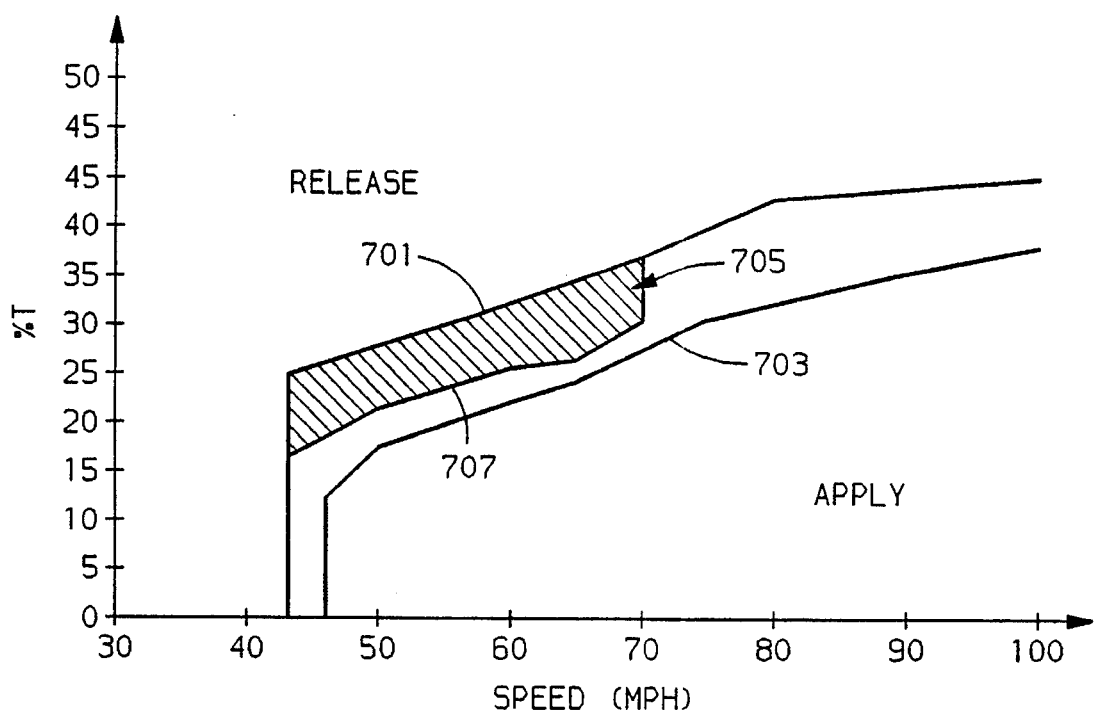
FIG. 7A represents a pair of base apply/release boundary lines for control of the TCC clutch.

The control functions described above are carried out by control unit 180 when it executes a program instruction set represented by the flow diagrams depicted in FIGS. 4–6. Such program may be part of a much larger computer program for performing other control functions and is preferably executed on a regular time basis within the background loop of regularly executed program instructions as illustrated in FIG. 3. FIG. 3 is illustrative of initialization of the control such as at every ignition cycle. Block 301 designates generally any initialization steps such as resetting flags, counters, timers to initial values for execution of various control routines. Specifically related to the present invention, block 301 initializes a TCC apply/release pattern "PATTERN" to a default calibration "BASE" pattern such as is graphically illustrated in FIG. 7a. FIG. 7a in this example shows base TCC apply and release patterns, 703 and 701 respectively, plotted against vehicle speed "VEH SPEED" and throttle position "% T" for the current gear "GEAR" ratio which in the exemplary illustration is the overdrive ratio of a four forward speed transmission. Other gear ratios may have similar graphical representations of apply/release patterns, however, typically only direct drive and overdrive ratios utilize TCC engagement. The schedule corresponds substantially to table data and interpolative points therebetween referenced when PATTERN is set to BASE utilized in normal control of the apply and release of the TCC. Block 302 represents a background loop continually executed, for example, every 25 milliseconds, to perform various conventional power train data acquisition, computation and output control functions. Additionally, this background loop is adapted to execute program steps as illustrated in FIGS. 4–6, which steps exemplify various aspects of a control method in accordance with the present invention.

Referring now to FIG. 4, a portion of program control steps executed in accordance with the present invention are illustrated. The steps illustrated are divided into preliminary steps 402–405, adaptive TCC control leg 420 and normal TCC control leg 440.

Step 402 is representative of data acquisition steps executed at least as frequently as the background loop although commonly executed more often. At execution of step 402, microcomputer 200 reads input values of the manifold absolute pressure signal (MAP), the brake signal (BR), throttle signal (% T), gear ratio signal (GEAR), engine speed signal ($N_e$), coolant temperature signal ($T_e$), transmission fluid temperature signal ($T_t$) and the turbine speed signal ($N_t$). Step 404 is next encountered and performs a check of conditions necessary to proceed with further processing. For example, if transmission temperature ($T_t$) is determined to be excessively high, then further processing in accordance with the present invention is bypassed via line 450. Excessive transmission fluid temperature is determined by design calibrations and is typically addressed by controls well known in the field designed to maintain TCC application to reduce the transmission fluid temperature. Another check specifically related to the application of the control of the present invention determines the state of the TCC at decision block 405. In operation, engine torque variations are sufficiently damped or attenuated when the TCC is released but may be objectionably sensed by the vehicle operator when the TCC is applied. Therefore, where the TCC is released, the routine bypasses the steps associated with the present inventive control. When the TCC is applied, processing continues to decision block 406.

Decision block 406 is where determination is made as to whether an adaptive TCC control is implemented based upon the value of a chuggle event counter "CHGCNT" determined during a series of previously executed control loops and a specific chuggle check routine described later with reference to FIG. 5. It is sufficient for continued explanation of the remaining steps of FIG. 4 to note that the value of the updated chuggle event counter CHGCNT is available for utilization at decision block 406 when executed. If CHGCNT is less than a predetermined calibration value "KCHGCNT", then it is deemed that a sufficient number of chuggle events have not occurred within a predetermined interval to justify implementation of adaptive TCC control directed toward reducing driveline disturbances and the steps of normal TCC control leg 440 are executed. In the present embodiment, the predetermined interval is defined by a complete ignition cycle of the vehicle. Other intervals, for example time or travel distance based intervals, are alternatives within the discretion of the designer and are fully contemplated by the inventors. On the other hand, if CHGCNT equals or exceeds KCHGCNT, then an adaptive TCC control is desirable and implemented through the steps encompassed by adaptive TCC control leg 420.

Assuming that adaptive TCC control is not desirable as decided at block 406, the TCC apply/release pattern is set to a BASE pattern at block 442. Step 444 next determines the appropriate TCC mode as a function of the BASE pattern as indicated. The preferred mode for accomplishing this is through a table look-up of the vehicle speed boundary in accordance with the current throttle position % T and current TCC mode. Processing then passes out of the present routine of FIG. 4. Other operations within the background loop including TCC application and release scheduling in accordance with the appropriate TCC flag setting and, preferably, a control of TCC shift busyness are described later in conjunction with FIG. 6.

As previously described, the referenced table data corresponds substantially to the illustrations of FIG. 7a, and the boundary vehicle speed returned corresponds to the appropriate point on the release boundary line 701 since it is known that the TCC is in fact in the applied mode. Where the intersection of current vehicle speed $N_e$ and throttle position % T falls below the release boundary line 701 in the figure, TCC application scheduling is indicated and the TCC flag remains unchanged. Similarly, when the intersection is above release boundary 701 in the figure, TCC release scheduling is indicated and the TCC flag is set to "OFF". The region between the release 701 and apply 703 boundary lines represents a calibrated hysteresis band as conventionally practiced in TCC control.

Figure 7B:
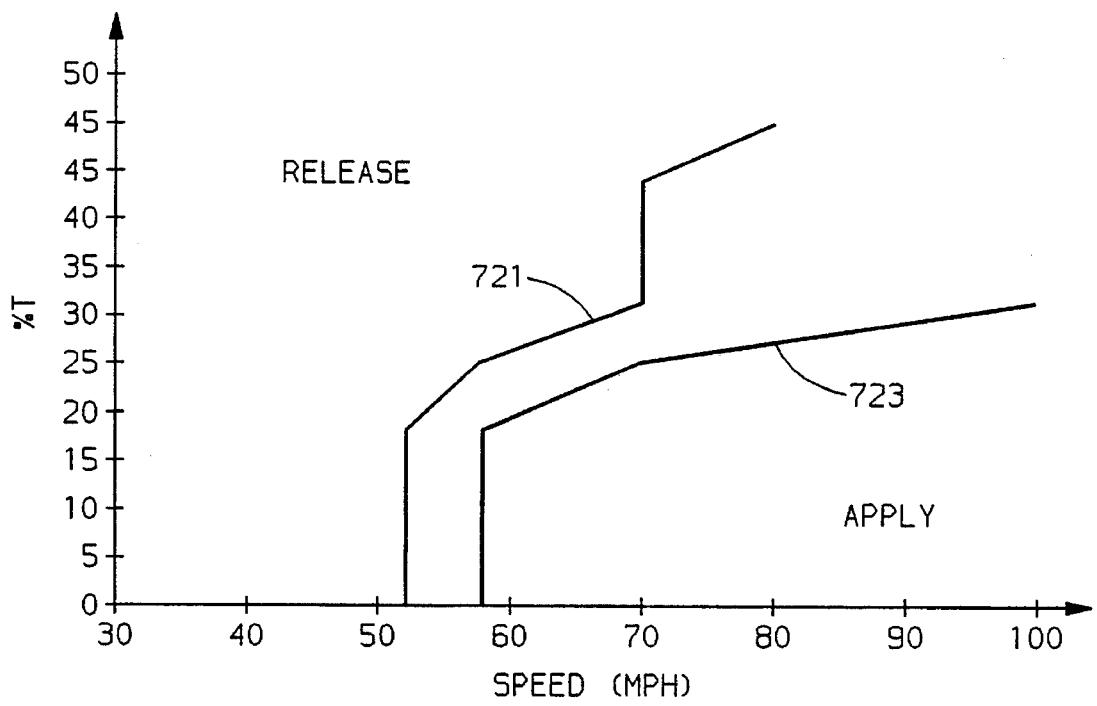
FIG. 7B represents a pair of adaptive apply/release boundary lines for control of the TCC clutch.

Assuming that adaptive TCC control is desirable as decided at block 406, then the steps of adaptive TCC control leg 420 are executed. Step 422 sets the current TCC apply/release pattern to an ADAPTIVE pattern. The ADAPTIVE pattern used for control of TCC application and release corresponds to the illustration in FIG. 7b showing adaptive TCC apply and release patterns plotted as vehicle speed "SPEED" versus throttle position "% T". The patterns correspond substantially to table data referenced when PATTERN is set to ADAPTIVE utilized in control of the apply and release of the TCC after determination that the engine has been operated at load and speed conditions particularly prone to driveline disturbances for a predetermined interval as determined through execution of the steps illustrated in FIG. 5. Exemplary adaptive apply and release boundary lines, 723 and 721 respectively, are shown plotted against vehicle speed "SPEED" and throttle position "% T" for the current gear ratio which in the exemplary illustration is the overdrive ratio of a four forward speed transmission.

Step 424 next determines the appropriate TCC mode as a function of the ADAPTIVE pattern as indicated. As with the BASE pattern, the preferred mode for accomplishing this is through a table look-up in the same fashion as described. The referenced table data of course corresponds substantially to the illustrations of FIG. 7b, and the boundary vehicle speed returned corresponds to the appropriate point on the release boundary line 721 since it is known that the TCC is in fact in the applied mode. Where the intersection of current vehicle speed $N_e$ and throttle position % T falls below the release boundary line 721 in the figure, TCC application scheduling is indicated and the TCC flag remains unchanged. Similarly, when the intersection is above release boundary 721 in the figure, TCC release scheduling is indicated and the TCC flag is set to "OFF". The region therebetween the release 721 and apply 723 boundary lines represents a calibrated hysteresis band. It will be appreciated that the release and apply lines of FIG. 7b will result in a later apply and earlier release with respect to vehicle speed for a given throttle position when compared with those of FIG. 7a.

A table look-up of an engine speed dependant calibration value "FXMAP($N_e$)" is next performed at block 426. Low engine speed operation tends to be significantly more prone to inducing driveline disturbances since torque is known to vary significantly over slight changes in throttle position at low engine speeds. Since torque disturbances are a substantially constant percentage of the average torque at high torques, the amplitude of these variations may rise to unacceptable levels. Together with these variations in engine torque, a significant positive correspondence can be expected in MAP. Therefore, a calibration table "FXMAP" indexed to engine speed $N_e$ provides values FXMAP($n_e$) over at least a range of engine speeds determined to be prone to driveline disturbances. Due to practical considerations including cost and diminishing likelihood of driveline disturbances at higher engine speeds it is desirable to limit the size of any such table, and an engine speed $N_e$ which exceeds a predetermined upper value, for example 1500 RPM, will preferably return the table value associated with that upper value. The range of engine speeds $N_e$ to which table FXMAP is referenced is determined empirically and of course will vary depending on acceptable levels of disturbance for a particular complement of vehicle and powertrain. If MAP is equal to or greater than the look-up value FXMAP ($N_e$), then step 430 sets the TCC flag to OFF thereby indicating the desired scheduling of the TCC based on MAP criteria. If, however, MAP is less than the look-up value FXMAP ($N_e$), then the control has determined that the engine is not immediately operating at load and speed conditions particularly prone to driveline disturbances, and TCC flag state is not affected by skipping step 430 and proceeding to step 432. The net result of steps 422–430 is that the TCC will be released by either a throttle based determination using an adaptive pattern or by a load based (MAP) determination.

Next encountered in conjunction with FIG. 4 is step 432 which sets the TCC apply/release pattern back to BASE. The TCC apply/release pattern thus referenced for subsequent usage during ratio shifting will not be the pattern used for adaptively controlling TCC application and release in response to driveline disturbances.

With reference now to FIG. 5, a routine for determining whether adaptive TCC scheduling is to be employed is disclosed. The routine is executed within the regular background loop and begins with a TCC mode check at step 502. Similarly as described with reference to the routine of FIG. 4, where engine torque variations are sufficiently damped through the fluid coupling of a TCC (i.e. TCC released) execution of further control steps directed toward attenuating driveline disturbances are not warranted. Therefore, where the TCC is released, the routine proceeds to step 510 where a timer "CHGTMR" is cleared and therefrom exits the routine via line 511. Assuming that the TCC is applied, a check of engine speed $N_e$ is performed against a predetermined calibration value "KRPMCHG". This calibration value represents an empirically determined upper RPM limit above which driveline disturbances are negligible and below which, in conjunction with a measure of engine load, is defined a chuggle prone region of engine operation. Examination of FIG. 7a shows the upper RPM to correspond to a vehicle speed of 70 MPH in the exemplary overdrive gear ratio. A negative response at step 504 causes termination of the routine via line 503, step 510 and line 511. An affirmative response allows execution of steps 506–520.

Figure 2:
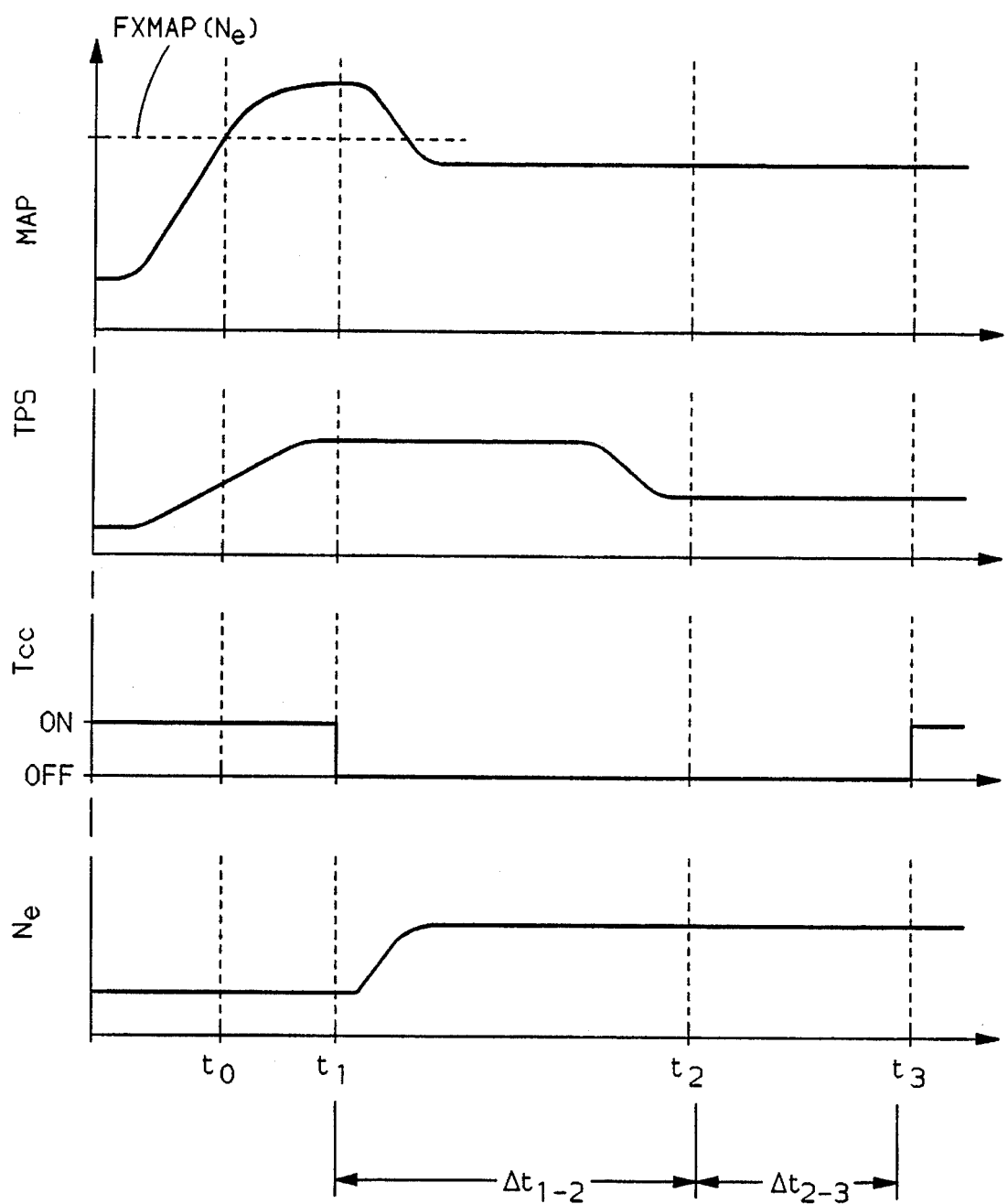
FIG. 2 illustrates various engine and transmission signals along a common time line used or controlled in accordance with the control of the present invention.

Step 506 performs a look-up of an engine speed dependant calibration value "FXMAP($N_e$)". Step 506 and subsequent step 508 are functionally identical to steps 426 and 428 executed in connection with previously described flowchart in FIG. 4. A negative response at step 508 thereby indicates that the engine is not immediately operating at load and speed conditions particularly prone to driveline disturbances and processing exits this routine via step 510 and line 511. A positive response, however, indicates that the engine is operative at load and speed conditions prone to driveline disturbances and step 512 is next encountered. This point is also illustrated in FIG. 2. at time $t_0$. It is the combination of an upper engine speed and engine load which defines a chuggle prone region 705 as illustrated within the hatched area between boundary line 701 and dynamic load line 707 of FIG. 7a. Dynamic load line 707 is an illustrative mapping of throttle positions which correspond to MAP readings taken over the range of vehicle speeds (approximately 43 MPH to 70 MPH) at a constant vehicle dynamometer introduced load sufficient to induce undesirable driveline disturbances. The load is intended to simulate higher than nominal loads from such sources as road grade, trailering, head-wind resistance etc. MAP, as a measure of engine load, will vary with variance in the loads actually presented to the vehicle and as such dynamic load line 707 may shift from the illustrated position. Also, load line 707 will shift with changes in atmospheric pressure and temperature which are known to have significant effects on engine torque production.

As previously indicated, engine torque can vary significantly over a relatively small throttle range especially at lower engine speeds. MAP is a vehicle load parameter utilized in the present embodiment to detect high engine torque corresponding to a high load. Normal TCC control in accordance with the pair of boundary lines 701 and 703 of FIG. 7a would not indicate the desirability of TCC release were it operative in apply mode within the hysteretic band between lines 701 and 703 regardless of actual load. Therefore, the control of the present invention provides recognition of a high load condition at low engine speed likely to produce objectionable drive line disturbances and performs appropriate corrective measures to reduce such disturbances by overriding the normal control responsive to the pair of base boundary lines 701 and 703. Additionally, the control of the present invention adaptively adjusts to the changing operating environment of the vehicle which effects the volumetric efficiency and hence torque producing capacity of the engine.

Step 512 checks timer CHGTMR against a calibration value KCHGTMR which, if exceeded, indicates continued operation within the chuggle prone region as described for a predetermined interval to constitute a steady state chuggle event for recordation and cumulation. If CHGTMR does not exceed the calibration value KCHGTMR then timer CHGTMR increments at step 514 and the routine is exited via line 515. A chuggle event as indicated by an affirmative response at step 512 causes TCC flag to be set to OFF at step 516 thus indicating the desired TCC state. FIG. 2 illustrates a period of time $t_0$-$t_1$ constituting steady state operation within the chuggle prone region and subsequent TCC clutch release. A chuggle event counter CHGCNT is incremented to record and cumulate events at step 518 and timer CHGTMR is reset at step 520. Processing next proceeds out of the routine. In the present embodiment, it is noted that no reset of the CHGCNT is provided and as such once the threshold KCHGCNT is exceeded (FIG. 4, block 406) TCC adaptive scheduling is invoked. A reset of CHGCNT is caused to occur at every ignition cycle. Of course, any other appropriate interval for resetting CHGCNT may be provided and remain within the scope of the invention; for example, an appropriate timeout period may be invoked through which if no chuggle events are detected, the CHGCNT is reset.

The overall result of the routines of FIGS. 4 and 5 is that individual driveline disturbances are predictably determined by accounting for engine operation within a region prone to such disturbances and cumulating an event when continuous operation within the region persists for a predetermined interval. The control overrides the normal TCC shift scheduling upon individually detected events to damp out the disturbances through fluid coupling of the engine to the transmission gearset and provides an adaptive shift schedule to prevent further events when a predetermined number of individual events occur within a predetermined interval.

Referring now to FIG. 6, a set of program instructions for preventing TCC busyness is represented by an exemplary flowchart. These instructions are performed without regard to the TCC mode (normal or adaptive) currently employed. Conventional TCC control includes an amount of time delay between TCC release and TCC re-apply which comprises a calibrated minimum time plus increments of time added to further delay re-application in situations where, for example, frequent consecutive coast releases are encountered. While not illustrated in the accompanying flowchart of FIG. 6, it should be understood that the delay "DELAY" is intended to encompass a minimum delay and any such pendant increments. Steps 602–606 represent the sequential chain of events which must occur through the control to arrive at step 608. Where TCC was actually applied (602), a TCC release was commanded by chuggle event or PATTERN schedule (604) and a re-apply of TCC is requested (606), a time based check is performed at step 608. Where the time between a release and a re-apply request is less than a calibration value "KBUSY", DELAY is incremented at step 610 and the routine exited. A portion of FIG. 2 illustrates the operation of this portion of the flow charts. TCC is commanded off at time $t_1$ and a re-apply request is initiated at time $t_2$. The period $\Delta t_{12}$ is compared to the calibrated value KBUSY. Actual re-apply occurs at time $t_3$, a period of time $\Delta t_{23}$ after $t_2$. The period $\Delta t_{23}$ represents a minimum delay and any increments occasioned by the period $\Delta t_{12}$ being less than the calibration value KBUSY. The routine thereby results in further control of TCC mode to ensure adequate time separation between releases and applies of the TCC. Though not illustrated in the flow chart of FIG. 6, DELAY is allowed to decay to a base value over a period when it is determined that additional delay time in excess of the base amount is no longer required.

While the invention has been exemplified with respect to a preferred embodiment as disclosed herein, it is contemplated that various modifications and alterations will be apparent to one having ordinary skill in the art and therefore the embodiment is intended to be taken by way of example and not limitation. Accordingly, the invention is intended to embrace all alternatives, modifications and variations which are within the scope of the appended claims.

The embodiments of the invention in which an exclusive property or privilege is claimed are defined as follows:

1. In a vehicle having a torque converter coupling the output of an internal combustion engine to the input of a transmission gearset, the torque converter having a selectively engageable torque converter clutch operable in a release mode and apply mode for effectuating hydrodynamic and mechanical coupling, respectively, between the internal combustion engine output and transmission gearset input, a method tier reducing torque induced driveline disturbances by controlling the mode of the torque converter clutch operation comprising the steps:

establishing the torque converter clutch mode in accordance with a base apply/release pattern;

determining engine speed;

determining manifold absolute pressure;

comparing manifold absolute pressure to a predetermined driveline disturbance threshold, said threshold being a function of said engine speed; and when manifold absolute pressure exceeds said threshold for a first predetermined interval, overriding the base apply/release pattern to command the operation of said torque converter clutch in the release mode for a second predetermined interval.

2. A method for reducing torque induced driveline disturbances by controlling the mode of torque converter clutch operation as claimed in claim 1 further comprising the steps:

recording a driveline disturbance event upon each base apply/release pattern override;

cumulating said events during a third predetermined interval; and when said cumulated events exceeds a predetermined number, substituting an adaptive apply/release pattern for said base apply/release pattern to minimize further driveline disturbances.

3. A method for reducing torque induced driveline disturbances by controlling the mode of torque converter clutch operation as claimed in claim 2 wherein said third predetermined interval comprises an ignition cycle.

4. A method for reducing torque induced driveline disturbances by controlling the mode of torque converter clutch operation as claimed in claim 1 wherein said first predetermined interval comprises a predetermined time.

5. A method for reducing torque induced driveline disturbances by controlling the mode of torque converter clutch operation as claimed in claim 1 wherein said steps are performed periodically and said first predetermined interval comprises a predetermined number of consecutive periods wherein manifold absolute pressure exceeds the predetermined driveline disturbance threshold.

6. In a vehicle having a torque converter coupling the output of an internal combustion engine to the input of a transmission gearset, the torque converter having a selectively engageable torque converter clutch operable in a release mode and apply mode for effectuating hydrodynamic and mechanical coupling, respectively, between the internal combustion engine output and transmission gearset input, a method for reducing torque induced driveline disturbances by controlling the mode of the torque converter clutch operation comprising:

establishing the torque converter clutch mode in accordance with a base apply/release pattern;

measuring a first quantity related to engine speed;

measuring a second quantity related to engine load;

predicting a driveline disturbance event from said first and second quantities by detecting continuous engine operation wherein said second quantity exceeds a predetermined function of said first quantity for a predetermined interval; and overriding said base apply/release pattern to release said torque converter clutch when said driveline disturbance event is predicted.

7. A method for reducing torque induced driveline disturbances by controlling the mode of torque converter clutch operation as claimed in claim 6 wherein said second quantity is manifold absolute pressure.

8. In a vehicle having a torque converter coupling the output of an internal combustion engine to the input of a transmission gearset, the torque converter having a selectively engageable torque converter clutch operable in a release mode and apply mode for effectuating hydrodynamic and mechanical coupling, respectively, between the internal combustion engine output and transmission gearset input, a method for reducing torque induced driveline disturbances by controlling the mode of the torque converter clutch operation comprising:

establishing the torque converter clutch mode in accordance with a base apply/release pattern;

measuring a first quantity related to engine speed;

measuring a second quantity related to engine load;

predicting a driveline disturbance event from said first and second quantities;

overriding said base apply/release pattern to release said torque converter clutch when said driveline disturbance event is predicted; cumulating each predicted driveline disturbance event; and when said cumulated driveline disturbance events exceeds a predetermined number, substituting an adaptive apply/release pattern for said base apply/release pattern.

* * * * *